J. C. PARKER.
STEAM GENERATOR.
APPLICATION FILED DEC. 20, 1906.

941,462.

Patented Nov. 30, 1909.
3 SHEETS—SHEET 1.

Witnesses
Jos. G. Denny Jr.
Rowe J ___

Inventor
John C. Parker
By
Charles N. Butler
Attorney

J. C. PARKER.
STEAM GENERATOR.
APPLICATION FILED DEC. 20, 1906.

941,462.

Patented Nov. 30, 1909.
3 SHEETS—SHEET 3.

Inventor
John C. Parker
By
Charles N. Butler
Attorney

Witnesses
Jos. G. Denny Jr.
R. J. Evans

UNITED STATES PATENT OFFICE.

JOHN C. PARKER, OF PHILADELPHIA, PENNSYLVANIA.

STEAM-GENERATOR.

941,462.  Specification of Letters Patent.  Patented Nov. 30, 1909.

Application filed December 20, 1906. Serial No. 348,722.

*To all whom it may concern:*

Be it known that I, JOHN C. PARKER, a citizen of the United States, residing in the city of Philadelphia, county of Philadelphia, and State of Pennsylvania, have invented certain Improvements in Steam-Generators, of which the following is a specification.

This invention has as its primary object to increase the efficiency of tubular boilers, and to this end its leading characteristics reside in means whereby water is caused to flow in a complete circuit through the tubes and headers, in directions through the tubes opposed to the courses of heating gases acting thereon, and the steam evolved is carried to a receptacle removed from the point of ebullition in an auxiliary circuit connected with the first circuit so that water entrained with the steam is carried back to and flows with the current through the tubes, the auxiliary circuit having means for preventing reverse flow and preferably a further receptacle for collecting water from the steam receptacle.

The invention is further characterized by circulating feed water in and opposite to the course of the heating gases after they have acted on the water in the generator throughout its circuit and then delivering such feed water to the generating circuit, preferably by the auxiliary circuit.

The invention is further characterized by a super-heater subject to substantially the same temperature as the part of the generator receiving the primary action of the heating gases, a conduit with a water separator connecting the steam chamber with the superheater and a conduit with a dry steam reservoir receiving the steam from the separator.

The invention also involves an arrangement of baffles and passes for handling the heating gases so that their energy will be exerted upon the circulating systems to produce the stated circulation and heating action.

The foregoing characteristics, with special features involved therewith, are embodied in the construction disclosed by the following description and the accompanying drawings in illustration thereof, of which—

Figure 1:
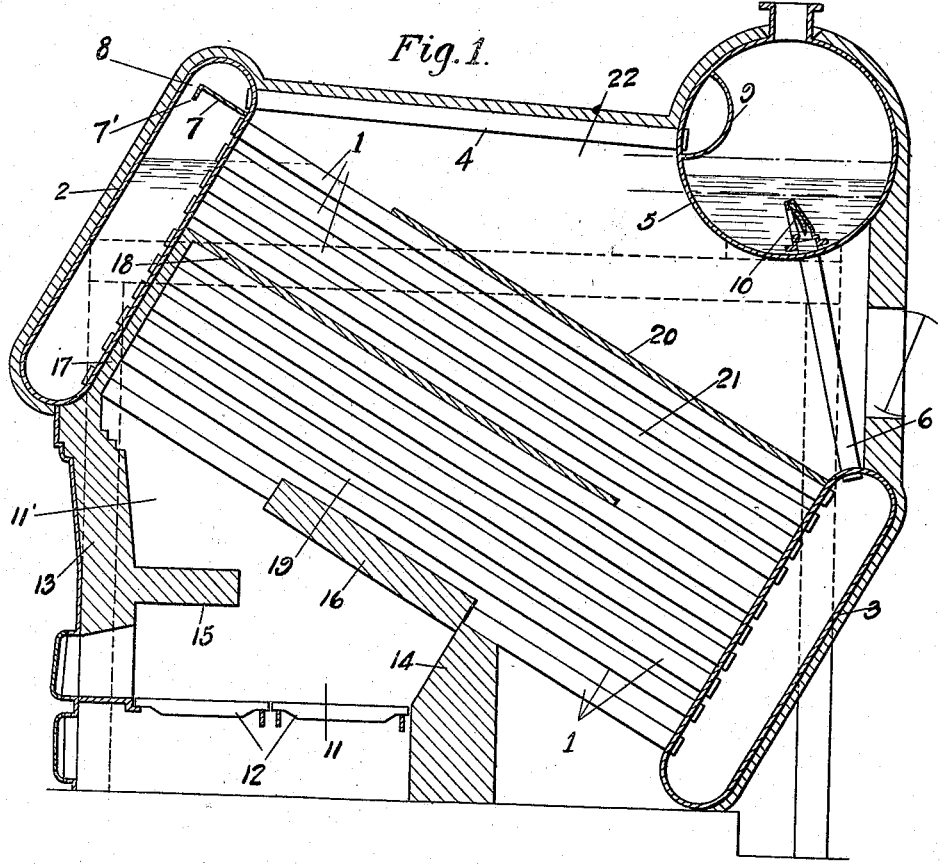
Figure 2:
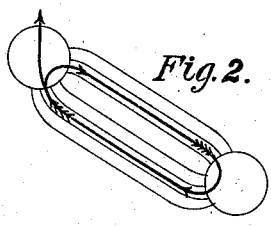
Figure 3:
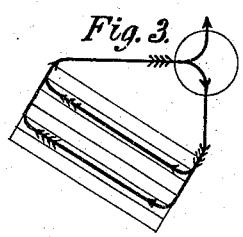
Figure 4:
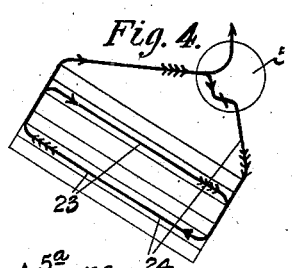
Figure 5:
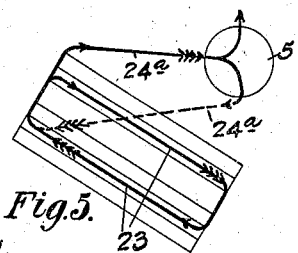
Figure 6:
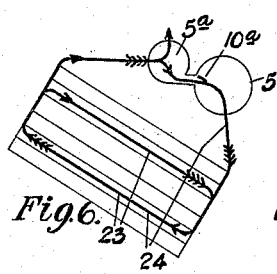
Figure 7:
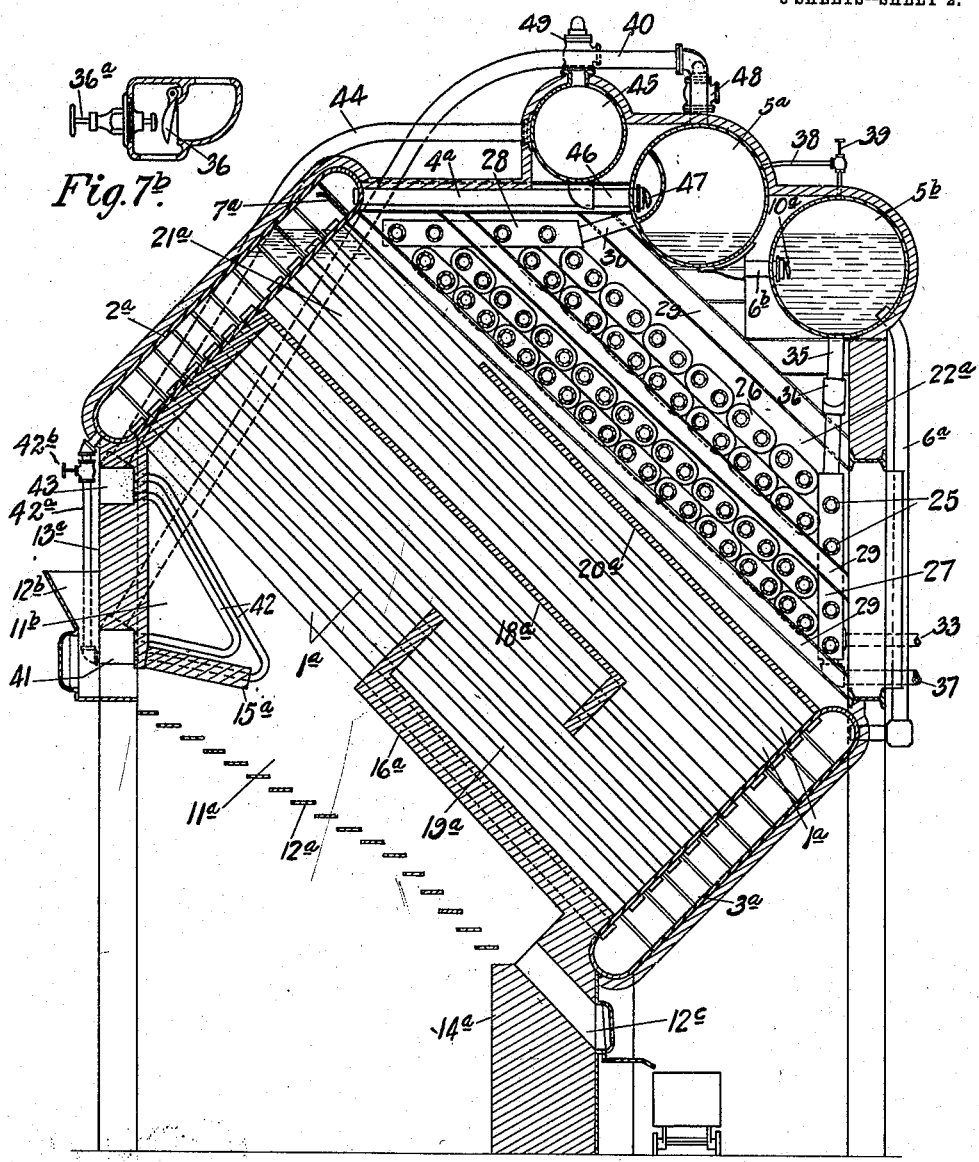
Figure 8:
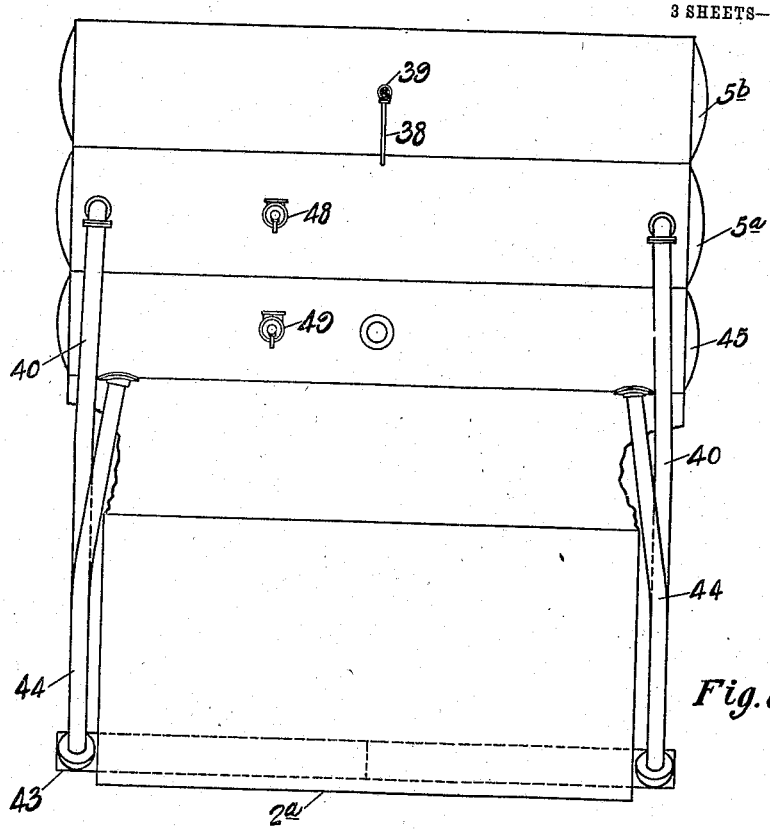
Figure 10:
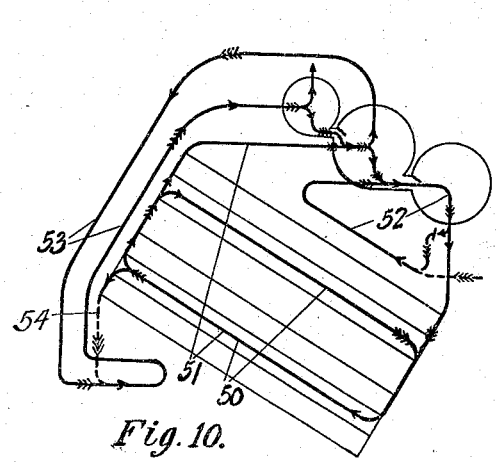
Figure 9:
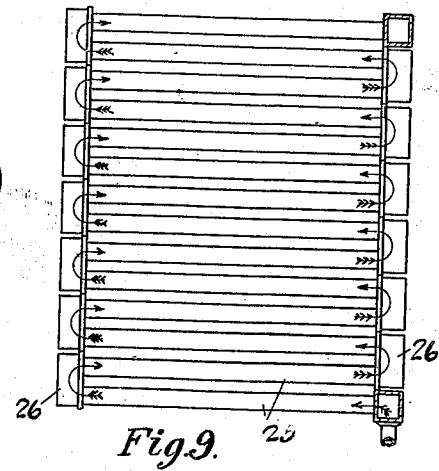

Figure 1 is a vertical sectional view of a simple form of the generator; Figs. 2 and 3 are diagrammatic representations of circuits characteristic of the prior art, and Figs. 4, 5, and 6 are diagrammatic representations of circuits characteristic of my invention; Fig. 7 is a vertical sectional view of a generator having a feed water heater and superheater; Fig. 7ª is an enlarged sectional view of the top of the upper header in its preferred form; Fig. 7ᵇ is a sectional view of a junction box and check valve; Fig. 8 is a top plan view of the construction shown in Fig. 7; Fig. 9 is a plan view of the feed water coils, and Fig. 10 is a diagrammatic representation of the generator, feed water and superheater circuits.

As shown in Fig. 1 of the drawings, inclined water tubes 1 have their respective ends connected by headers 2 and 3. The upper header 2 has its top connected by tubes 4 with the steam chamber or drum 5 and the bottom of the drum is connected by water tubes 6 with the top of the lower header 3. A plate 7, in the top of the header 2, baffles the ebullient water and requires the steam to escape through the narrow pass 8 with separation of water therefrom; and a plate 9 directs the steam ejected from the tubes 4 into the drum, to prevent spraying and separate water from the steam. Gravity actuated check valves 10 are connected with the ends of restricted tubes 6 (projecting into the drum 5) so as to prevent reverse flow therethrough.

The forward and higher ends of the tubes have thereunder the primary combustion chamber 11, which contains the grate 12 located between the front wall 13 and the bridge wall 14. To provide a reverberatory action therein, the chamber has the baffle 15 extending rearwardly from the front wall and the baffle 16 extending forwardly from the bridge wall. From the chamber 11 the products of combustion pass into the chamber 11' (for completing combustion) directly beneath the upper part of the lower tubes 1, which are thus subjected to the primary action of the heating gases. The lower part of the front header is protected by the covering 17, the baffle 18 extends therefrom between the tubes 1 toward the rear header to provide the pass 19, and the baffle 20 extends from the rear header above the tube bank toward the header 2 to provide the pass 21, the latter communicating at its lower end with the lower end of the pass 19 and discharging at its upper end into the pass 22, which contains the tubes 4, drum 5 and tubes 6. The lower pass 19 is preferably larger and contains a larger number of tubes than the upper pass 21, corresponding to the higher energy of the heating gases in the former pass, and as the primary energy of the heating gases is exerted on the upper end of the lower tubes the bulk of the steam generated has but a short upward travel to escape from the tubes, with the minimum frictional resistance. This arrangement induces a flow of the water contained in the generator upwardly through the tubes in the lower pass and the upper header and downwardly through the tubes in the upper pass and the lower header, the headers and upper course having such cross sectional relation to the lower course as to secure the minimum frictional resistance throughout the circuit. The steam separates from the water in the upper header, escapes around the baffle 7 and flows by the tubes 4 into the drum 5, while water collected in the drum falls through the restricted tubes 6 and the header 3 and flows upwardly with the current through the lower tubes 1. The courses of the circulating water are represented, in Fig. 4, by the circuit 23, and the courses of the steam and the water separated therefrom are represented by the auxiliary circuit 24 containing the steam and water chamber 5.

As shown in Fig. 5, the main circuit 23 may have the water returned thereto from the chamber 5 by the course represented by the dotted line in the circuit 24$^a$.

As shown in Fig. 6, the circuit 24, auxiliary to the circuit 23, may have therein the steam chamber 5$^a$ and the water chamber 5$^b$, with the check valve 10$^a$ for preventing reverse flow from the latter to the former.

In the construction illustrated in Figs. 7 to 10 inclusive, the tubes 1$^a$ are connected at their respective ends by headers 2$^a$ and 3$^a$, which have their upper ends connected by tubes 4$^a$ and 6$^a$ with the respective drums 5$^a$ and 5$^b$, the latter being connected with the former by a duct 6$^b$ controlled by a check valve 10$^a$.

In the top of the header 2$^a$ is a baffle 7$^a$ restricting the passage, the baffle consisting of the plates 7$^b$ and 7$^c$ supported by the stay bolt 7$^d$, the plate 7$^c$ having its inner edge engaged by the clip 7$^e$ fixed to the plate 7$^b$ and its outer edge turned down and supported by the hook 7$^f$ depending from the stay bolt, the plate 7$^c$ being removed readily to give access to the tube 4$^a$.

The primary combustion chamber 11$^a$ has the inclined grate 12$^a$ extending between the front wall 13$^a$ and the rear wall 14$^a$, the fuel being charged by the hopper 12$^b$ at the upper end of the grate and the ashes discharged by the door 12$^c$ at the lower end. The baffles 15$^a$ and 16$^a$ direct the products of combustion into the chamber 11$^b$ below the upper ends of the lower tubes 1$^a$, whence they are directed by the baffles 18$^a$ and 20$^a$ through the passes 19$^a$ and 21$^a$ into the pass 22$^a$.

Feed water coils, comprising the tubes 25 connected by the junction boxes 26, are joined at their corresponding ends by the headers 27 and 28 and supported by the beams 29 in the pass 22$^a$, the tubes 25 extending transversely to the tubes 1$^a$. The upper header 28 is connected by the conduit 30 to the drum 5$^a$, to which water is delivered from the coils; the latter being supplied by the pipe 33 connected with the lower header 27. A conduit 35, having a check valve 36 therein, leads from the bottom of the drum 5$^b$ to the top of the header 27, the valve being closable or permitted to open to a desired degree by the stem 36$^a$. A blow off pipe 37 leads from the bottom of the header 27.

The drums 5$^a$ and 5$^b$ are connected by a pipe 38, with a valve 39 therein, which acts as a by-pass, and the drum 5$^a$ has a conduit 40 connected therewith which leads to the box 41.

The box 41 connects the lower ends of the bent superheater tubes 42, which are disposed in the combustion chamber 11$^b$ and have their upper ends connected by the box 43, and a conduit 44 connects the box 43 with a dry steam drum 45. The bottom of the drum 45 has connected therewith a conduit 46 which leads to the drum 5$^a$ and has a check valve 47 to prevent reverse flow.

A flooding pipe 42$^a$ controlled by the valve 42$^b$ connects the header 2$^a$ with the box 41.

The drum 5$^a$ is provided with a safety valve 48 and the drum 45 is provided with a safety valve 49 set to blow before the valve 48.

The heating gases acting primarily upon the upper ends of the lower tubes 1$^a$, the water and the steam generated rise in the header 2$^a$ and separate in the top thereof, the water flowing downward through the tubes in the pass 21$^a$ and upward through the tubes in the pass 19$^a$, by courses opposite to those of the heating gases. The steam flows through the tubes 4$^a$ into the steam drum 5$^a$, as previously described, and water collected in the steam drum flows into the drum 5$^b$, thence by the restricted tube 6$^a$ into the header 3$^a$, and thence upwardly through the lower tubes 1$^a$. The feed water coils also circulate the water (which is introduced thereto by the pipe 33 through the header 27 and under occasional conditions by the conduit 35) upwardly in the direction opposite to that of the heating gases in contact therewith. The steam which collects in the drum 5$^a$ flows by the conduit 40 to the box 41, thence through the tubes 42 into the box 43 and thence by the conduit 44 to the drum 45, any water deposited from the steam in the drum 45 being passed to the drum 5ª by the passage 46.

The several circuits are indicated by Fig. 10 wherein the courses 50 represent the main generating circuit, the courses 51 represent the auxiliary circuit of the steam evolved from the generating circuit and water separated therefrom, the courses 52 represent the feed water circuit, and the courses 53 represent the superheater circuit, the dotted line 54 representing the course by which water is admitted to the superheater circuit.

The superheater tubes 42, disposed so as to receive the primary action of the heating gases, are made of small caliber and comparatively short so that the steam flowing therethrough shall have the high velocity and the high friction per unit of surface requisite for absorbing the high degree of heat to which they are subjected, whereby a very high superheating efficiency is obtained with minimum total frictional loss. The superheater and lower generating tubes being subject to substantially the same primary action of the flame, and their construction being designed to maintain a constant ratio between the generating and superheating efficiencies, their efficiencies will vary together with changes in the heating action.

The action of the heating gases upon the superheater and generator is modified by the baffles 15ª and 16ª, which absorb heat when the furnace temperature runs high and give it up when the temperature runs low, being proportioned to provide heat storage capacities such that the ratio of the efficiencies of the surfaces shall not be disturbed. The drum 45 provides a reservoir for storing the dry steam from the superheater, steadying the flow through the superheater, steadying the temperature and separating the water deposited from steam when starting or standing with banked fires. It is to be observed that these improvements bring the point of equalization to the steam and water collecting mechanism so that when steam is drawn the circulation in the generator is not retarded, broken or reversed at any point, as in the usual constructions. It is also to be observed that the use of the water drum 5ᵇ, with steam in the top thereof, and the restricted tubes 6ª provide elastic action which supports the flow and steadies the effect of withdrawing steam or subjecting the generator to irregular conditions.

Having described my invention, I claim:—

1. A steam generator having a water circuit, and a second circuit connected with said first circuit, said second circuit having the flow of water therethrough restricted and a chamber therein to which steam is carried from said first circuit and from which water is carried back to said first circuit.

2. A steam generator having a water circuit comprising a bank of inclined tubes with headers connecting their respective ends and a restricted auxiliary circuit connected therewith, in combination with means for applying the primary action of the heating gases to the upper ends of the lower tubes, means for directing said heating gases from the upper ends downwardly along said lower tubes, and means for directing said heating gases from the lower ends of the lower tubes upwardly along the upper tubes.

3. A steam generator having a water circuit comprising a bank of inclined tubes with headers, a restricted steam and water circuit comprising a chamber connected with said headers, and baffling for directing the heating gases downwardly along the lower tubes and upwardly along the upper tubes, said baffling forming passes of which the lower is larger than the upper.

4. A steam generator having a water circuit comprising a bank of inclined tubes with headers connecting their respective ends in combination with a steam and water circuit comprising a drum, a passage leading from the upper header to said drum, a passage leading from said drum to the lower header and an automatic valve for preventing reverse flow from said last named passage through said drum.

5. A steam generator having a main circuit comprising a bank of inclined tubes, and headers respectively connecting corresponding ends of said tubes, in combination with an auxiliary circuit comprising a pair of communicating chambers, means for preventing reverse flow from the lower to the upper chamber, a passage connecting the upper header with the upper chamber and a passage connecting the lower chamber with the lower header.

6. A steam generator comprising a set of inclined steam generating tubes, a steam and water containing mechanism, a passage for conveying steam from said tubes to said containing mechanism, the flow of water to said containing mechanism being restricted, a passage for conveying water from said containing mechanism to said tubes, between said passages a set of feed water tubes disposed transversely to and above said generating tubes, and means for carrying the heating gases over said tubes in directions opposite to the respective directions of flow in both the generating and feed water tubes.

7. A steam generator comprising a bank of inclined steam generating tubes with headers connecting respectively corresponding tube ends, a steam and water containing mechanism, a passage leading from the upper header to said steam and water containing mechanism, a passage leading from said steam and water containing mechanism to the lower header, feed water tubes above said generating tubes, and means for connecting said feed water tubes with the circulating system.

8. A steam generator comprising a set of steam generating tubes, a steam chamber, a water chamber with which said steam chamber communicates, a passage from said tubes to said steam chamber, a passage from said water chamber to said tubes, a set of feed water tubes, a passage connecting said feed water tubes with said steam chamber, and a passage connecting said water chamber with said feed water tubes.

9. A steam generator comprising a set of steam generating tubes, a steam and water collecting mechanism connected therewith, a set of feed water tubes, and a header connecting the inlets to said feed water tubes and said collecting mechanism.

10. A steam generator comprising a set of generating tubes, compartments for collecting steam and water, a valved passage connecting said compartments, passages respectively connecting opposite ends of said tubes with the respective compartments, a set of superheating tubes, a passage connecting one of said compartments with said superheating tubes, a third compartment, and a passage connecting said superheating tubes with said third compartment.

11. A steam generator comprising a set of inclined tubes, a compartment, a passage connecting the higher ends of said tubes with said compartment, a second compartment, a passage connecting said first and second compartments, a valve for preventing reverse flow from said second to said first compartment through said passage last named, a passage connecting the second of said compartments with the lower ends of said tubes, a valve for preventing reverse flow from said tubes to said second compartment through said last named passage, a set of superheating tubes, a passage connecting said first named compartment with said superheating tubes, a third compartment, a passage connecting said superheating tubes with said third compartment, a passage connecting said third compartment with said first compartment, and a valve for preventing reverse flow from said first compartment to said third compartment through said passage last named.

12. A steam generator having a circuit comprising a set of steam generating tubes, a header connecting said tubes, and an auxiliary circuit comprising a steam collecting chamber connected with the top of said header, said header having separating means in the top thereof and the flow of water through said auxiliary circuit being restricted.

13. A steam generator comprising a header, a steam collecting chamber, a passage leading from the top of said header to said chamber, and a separating device disposed in the top of said header, said device comprising a fixed plate and a detachable plate connected to said fixed plate in front of said passage.

14. A steam generator having connected in circuit a set of feed water heating tubes, steam and water collecting mechanism above said feed water tubes, steam generating tubes below said feed water tubes, and steam superheating tubes below said generating tubes, in combination with a furnace having means for passing the gaseous products of combustion therefrom in contact with said superheating tubes, said generating tubes, said feed water tubes, and said steam and water collecting mechanism, superheater tubes and generator tubes aforesaid being disposed to receive the primary action of the heating gases.

15. A steam generator having connected in circuit means comprising feed water heating tubes, steam generating tubes and steam superheating tubes, in combination with a furnace having means for passing the gaseous products of combustion into contact with said tubes, superheater tubes and generator tubes aforesaid being disposed to receive the primary action of the heating gases.

In testimony whereof I have hereunto set my name this 15th day of December, 1906, in the presence of the subscribing witnesses.

JOHN C. PARKER.

Witnesses:
ROBERT JAMES EARLEY,
JAS. G. DENNY, Jr.